Patented Mar. 25, 1941

2,236,125

UNITED STATES PATENT OFFICE 2,236,125

PROCESS OF PREPARING MIXED ESTER ANHYDRIDES

Peter J. Wiezevich, Elizabeth, N. J., now by judicial change of name Peter J. Gaylor, assignor to Standard Oil Development Company, a corporation of Delaware No Drawing. Application April 14, 1937, Serial No. 136,833

10 Claims. (Cl. 260—341)

The present invention relates to improvements in the manufacture of organic compounds of the type of acid anhydrides. The invention also includes improvements in the recovery of such compounds and the production of useful commercial products therefrom, and is a continuation-in-part of Serial No. 556,940, filed August 13, 1931, Patent No. 2,099,909.

The invention has for one of its principal objects a process of making acid anhydrides and mixed ester anhydrides by reacting ketene or its homologs or polymers with organic acids other than that corresponding to the ketene used, and separating the compounds so formed.

Further objects of the invention will appear as the description proceeds.

Organic acids having more than two carbon atoms and having a boiling point above 130° C. upon being treated at ordinary temperatures (such as 20° C.) with ketene, enter into a chemical reaction, which is generally manifested by the liberation of heat. The reaction which occurs consists in the addition of the ketene to the organic acid with the resulting formation of an aceto-organic acid mixed anhydride, probably according to the following equation:

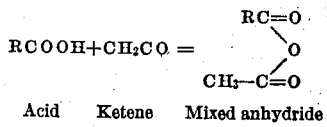

Acid    Ketene    Mixed anhydride where R is an alkyl radical containing two or more carbon atoms.

The product so formed is relatively unstable, being easily decomposed by heat to yield an organic anhydride and acetic anhydride, likely according to the following:

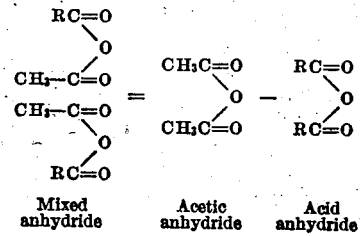

Mixed anhydride    Acetic anhydride    Acid anhydride

On subjecting the mixed anhydride to heat and distillation at atmospheric pressure or at a pressure lower than atmospheric, acetic anhydride is separated in the form of a vapor, and is condensed. The residual acid anhydride obtained in the distillation is removed as bottoms. It is more reactive than the corresponding acid and may be used directly to esterify hydroxy compounds such as alcohols, cellulose, glycols, etc. or to acylate amino compounds, such as aniline, benzylaniline, etc. Neutral solvents, such as ethyl ether, acetone, etc., may be used to keep the organic acid in solution, especially when the acids treated are solids or very viscous liquids. These solvents are generally recovered before the distillation of the acid anhydrides. Aliphatic, cyclic or heterocyclic organic acids are used to react with ketene in the above reactions.

The method described above mentions the treatment of a single organic acid. However, a mixture of two or more organic acids may be treated in a like manner and after removal of the solvent and acetic anhydride, may be fractionated into the separate anhydrides, or used as a mixture of anhydrides. Polybasic acids may be used in a like manner.

Organic acids containing the hydroxyl or amino groups, upon treatment with ketene at ordinary temperatures form ester acids or mixed ester anhydrides. For instance, upon treating an organic hydroxy acid with ketene, the ketene first reacts with the hydroxyl group forming an ester acid and may then further add to the carboxyl group with the resulting formation of a mixed ester anhydride of the organic hydroxy acid and acetic acid. Upon heating, the relatively unstable mixed ester anhydride of the organic acid is decomposed to acetic anhydride and the corresponding ester anhydride. These are then separated by distillation as described previously.

The following examples are given merely to illustrate the invention and are not to be regarded as limiting the invention in any respect.

A solution of tartaric acid in acetone was treated at room temperature with gaseous ketene for six hours, after which the acetone was allowed to evaporate off. The product was a clear viscous liquid consisting essentially of acetic ester of tartaric acid.

Rapid evolution of heat takes place during such reactions and suitable cooling means are preferably provided to maintain substantially low temperature, below 50° C. or at most 100° C., and preferably the temperature is maintained at or about room temperature or below. Instead of using acetone, other solvents, such as ether, etc., may be used.

Upon further and more complete reaction of the ketene with the tartaric acid mentioned in the above example, the carboxyl groups combine with the ketene to form a mixed ester anhydride of tartaric acid and acetic acid. If this mixed ester anhydride is subjected to heat treatment, for example, at a temperature above 130° C., the acetone or other neutral solvent used is volatilized and may be condensed and it is found that the remaining liquid is now a mixture of acetic anhydride and an ester anhydride of the original tartaric acid used. These two anhydrides may be separated by distillation by taking off the acetic anhydride overhead in the form of a vapor and condensing it. The acetic ester anhydride of tartaric acid is recovered as bottoms in the distillation.

Glycine, which is an amino aliphatic acid having the formula $CH_2(NH_2)COOH$, is reacted with ketene in a similar manner. Upon heating and fractionating off the acetic anhydride, a residue is recovered consisting mainly of a diacetylamino acetic anhydride having the formula $(CH_2NHCOCH_3CO)_2O$.

For the sake of illustration, the following list is given showing a number of hydroxy acids and amino acids which may be reacted with a ketene according to the method of the present invention:

| Acid | Formula |
| --- | --- |
| Hydroxy acetic acid (glycolic acid) | $OH.CH_2.COOH$. |
| β-Hydroxy propionic acid (β-lactic acid) | $OH.CH_2.CH_2.COOH$. |
| Ethylidene lactic acid | $CH_3.CH(OH).COOH$. |
| Hydroxy butyric acid | $OH.CH_2.CH_2.CH_2.COOH$. |
| α-Hydroxy isobutyric acid | $(CH_3)_2.C(OH).COOH$. |
| Hydroxy caproic acid | $C_4H_9.CH(OH).COOH$. |
| Hydroxy stearic acid | $C_{17}H_{34}(OH)COOH$. |
| Tartronic acid | $OH.CH(COOH)_2$. |
| Tartaric acid | $[CH(OH)]_2(COOH)_2$. |
| Malic acid | $COOH.CH_2.CH(OH).COOH$. |
| Citric acid | $COOH.CH_2.C(OH)(COOH).CH_2.COOH$. |
| Hydroxy benzoic acid (salicylic acid) | $(OH)C_6H_4.COOH$. |
| Hydroxy toluic acid | $C_6H_4(COOH)(OH)CH_3$. |
| Hydroxy naphthoic acid | $(OH).C_{10}H_6.COOH$. |
| Gallic acid | $(OH)_3C_6H_2.COOH$. |
| Glycine (glycocoll) | $CH_2(NH_2)COOH$. |
| Leucine | $C_4H_9.CH(NH_2)COOH$. |
| o-Amino benzoic acid (anthranilic acid) | $NH_2.C_6H_4.COOH$. |

Various other hydroxy and amino aliphatic cyclic and heterocyclic acids may be used. Acids of these types containing groups which do not react with ketene may also be used.

The temperature at which the ketene is absorbed is preferably around 20° C. in most cases as stated above. However, variations are permissible provided that the heat of reaction is not sufficient to prevent the formation of the desired compounds. In the stage of separating the products formed by the ketene absorption, a temperature is preferably employed just above that which is sufficient to distill off the lower boiling of the products, leaving the residual products in the still. It is within the scope of the invention, however, to distill over the products and fractionally condense them. Any desired means of further purification of the products may be employed.

Instead of using ketene, $CH_2CO$, one may use various homologs thereof, such as methyl ketene, $CH_3CHCO$, etc.

It will be understood that the foregoing description is merely illustrative of the invention, and that various changes and alternative procedures and proportions may be adopted within the scope of the appended claims, in which it is my intention to claim all novelty inherent in the invention as broadly as the prior art permits.

I claim:

1. The process which comprises reacting a ketene with an hydroxy aliphatic carboxylic acid, whereby a mixed ester anhydride is obtained, the reaction being conducted in anhydrous liquid phase and at a temperature not higher than 100° C.

2. A process according to claim 1 in which the reaction is conducted at about room temperature.

3. A process according to claim 1 in which the reaction is carried out in the presence of an inert solvent.

4. The process which comprises reacting, in anhydrous liquid phase and at a temperature not higher than 100° C., a hydroxy aliphatic carboxylic acid with an amount of a ketene sufficient only to react with a hydroxyl group of the acid to form an ester acid.

5. The process which comprises reacting a ketene with a carboxylic acid containing a plurality of hydroxyl groups, whereby a mixed ester anhydride is obtained, the reaction being conducted in anhydrous liquid phase and at a temperature not higher than 100° C.

6. The process which comprises reacting a ketene with a dihydroxy aliphatic carboxylic acid, whereby a mixed ester anhydride is obtained, the reaction being conducted in anhydrous liquid phase and at a temperature not higher than 100° C.

7. The process which comprises reacting a ketene with tartaric acid in anhydrous liquid phase at room temperature, whereby the corresponding diacetic ester dianhydride is obtained.

8. The process which comprises reacting ketene with tartaric acid whereby the corresponding diacetic ester dianhydride is obtained, the reaction being conducted in anhydrous liquid phase at a temperature not higher than 100° C.

9. The process which comprises reacting ketene with an acetone solution of tartaric acid under anhydrous conditions at room temperature, whereby the corresponding diacetic ester dianhydride is obtained.

10. The process which comprises reacting ketene with tartaric acid in anhydrous liquid phase and at a temperature not higher than 100° C. to form a mixed ester anhydride of tartaric acid and acetic acid, and heating the latter to obtain acetic anhydride and an ester anhydride of tartaric acid.

PETER J. WIEZEVICH.